United States Patent [19]

Danno et al.

[11] Patent Number: 4,506,338
[45] Date of Patent: Mar. 19, 1985

[54] METHOD AND APPARATUS FOR JUDGING THE STATE OF OPERATION OF AN INTAKE PASSAGE PRESSURE DETECTING DEVICE FOR AN ENGINE

[75] Inventors: Yoshiaki Danno; Tatsuro Nakagami, both of Kyoto, Japan

[73] Assignee: Mitsubishi Jidosha Kogyo Kabushiki Kaisha, Tokyo, Japan

[21] Appl. No.: 319,743

[22] Filed: Nov. 9, 1981

[30] Foreign Application Priority Data

Nov. 27, 1980 [JP] Japan ................. 55-167088

[51] Int. Cl.$^3$ ............................................. G01R 31/28
[52] U.S. Cl. .................... 364/551; 123/487;
364/550; 371/14; 371/20; 371/66; 371/67
[58] Field of Search ............ 364/550, 551; 371/14, 371/20, 66, 67; 73/115, 118; 123/487

[56] References Cited

U.S. PATENT DOCUMENTS 4,322,847  3/1982  Dodge et al. ................. 371/20
4,356,726  11/1982  Yoshino ......................... 73/178 R
4,391,130  7/1983  Nakano et al. ................. 73/117.3

Primary Examiner—Errol A. Krass
Assistant Examiner—Heather R. Herndon
Attorney, Agent, or Firm—Robert E. Burns; Emmanuel J. Lobato; Bruce L. Adams

[57] ABSTRACT

According to the method of the present invention for judging the state of operation of an intake passage pressure detecting device for an engine, first at the time of starting control the intake passage pressure detecting device is regarded as being in a state of failure, then an initial output from the intake passage pressure detecting device is stored, and in case the difference between this stored initial output and a subsequent output from the intake passage pressure detecting device exceeds a predetermined value, it is judged that the intake passage pressure detecting device is in a state of normal operation. Consequently, the state of operation of the above intake passage pressure detecting device can be judged with high reliability, and the reliability of the entire system can be improved to a large extent.

The apparatus of the present invention for judging the state of operation of an intake passage pressure detecting device for an engine is of a simple construction comprising a power-on reset circuit, a memory circuit, a comparison/change detecting circuit and a failure output circuit, whereby the state of operation of the above intake passage pressure detecting device can be judged with high reliability and, like the method of the present invention, the reliability of the entire system can be greatly improved.

25 Claims, 17 Drawing Figures

FIG. 2'A
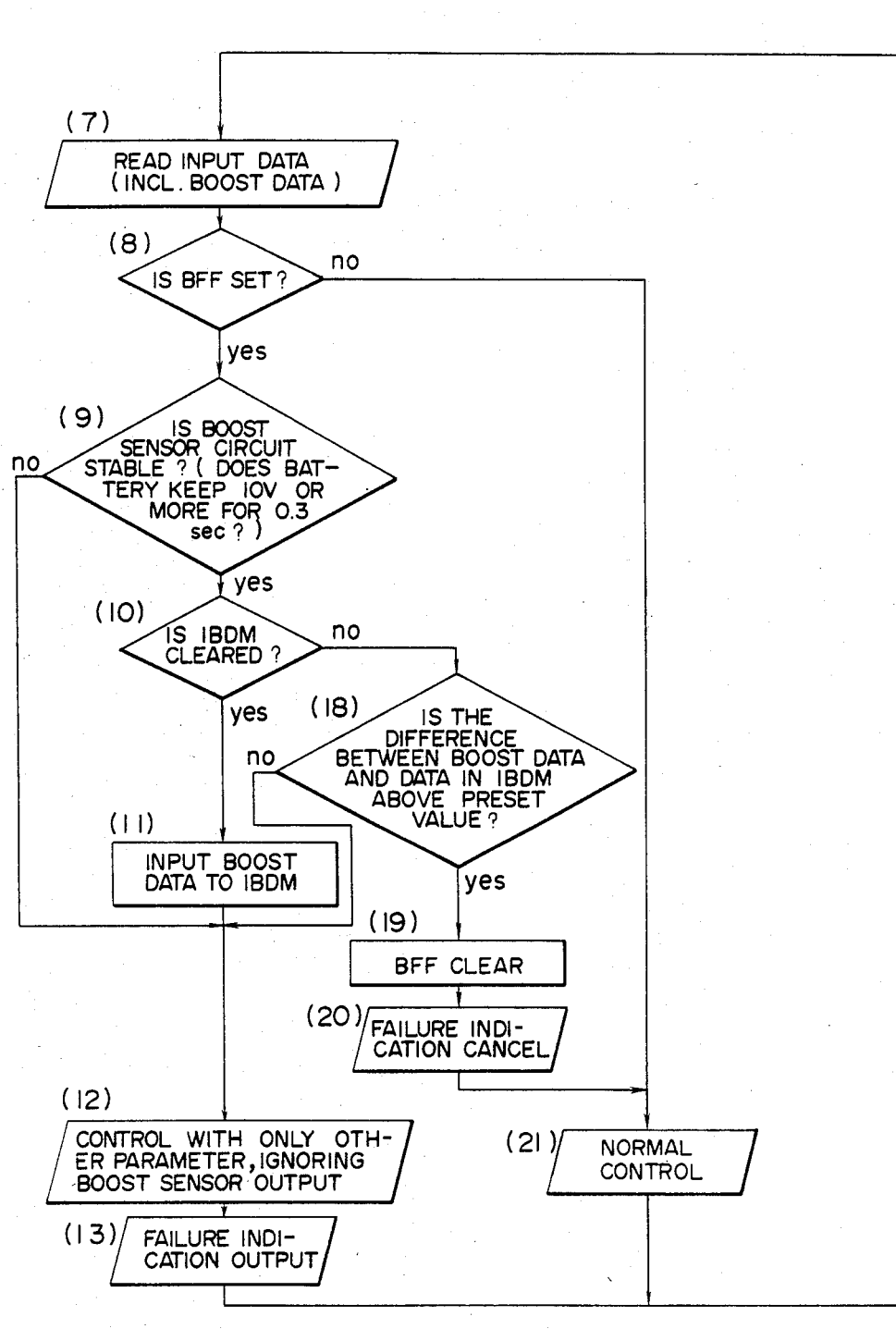

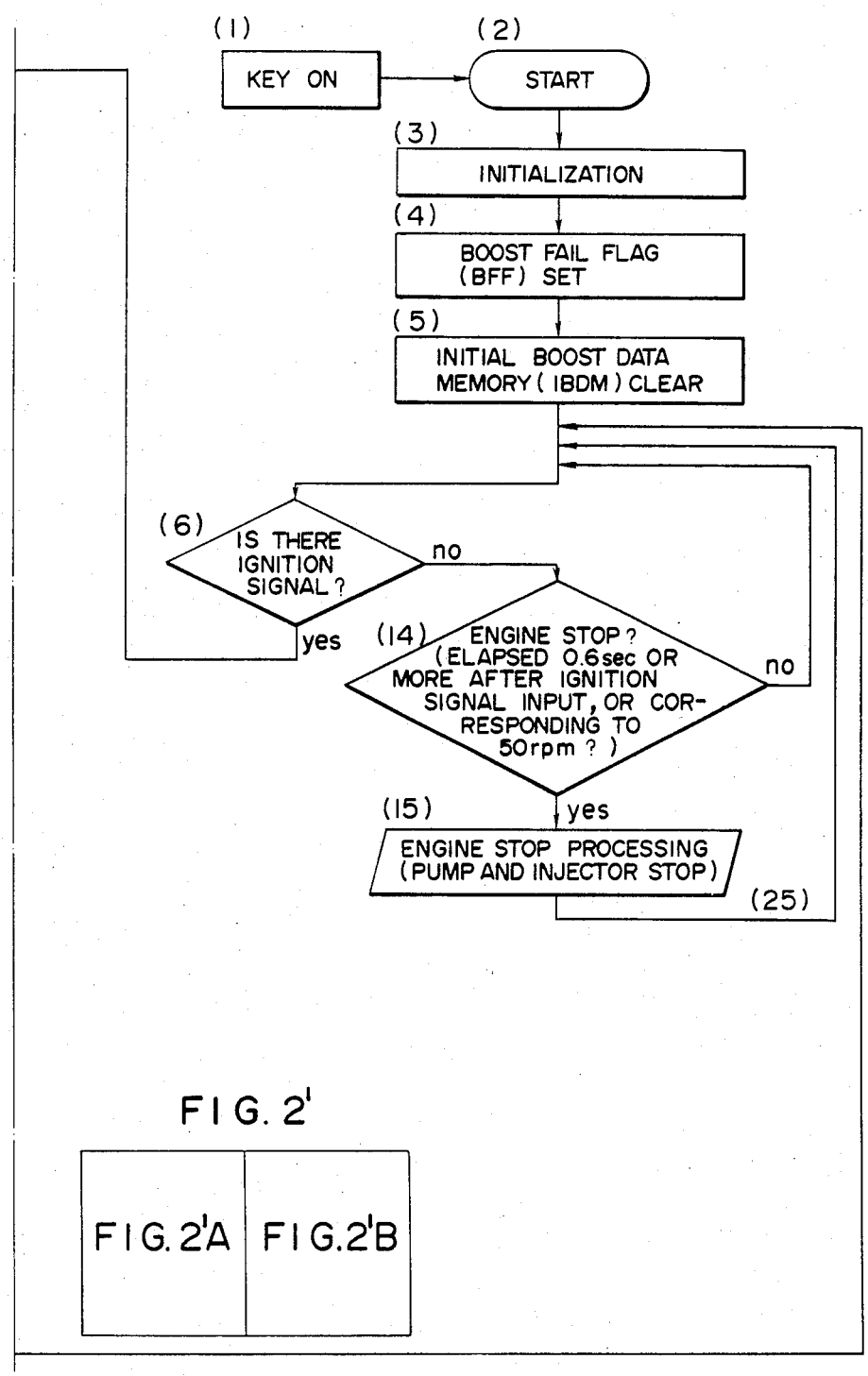

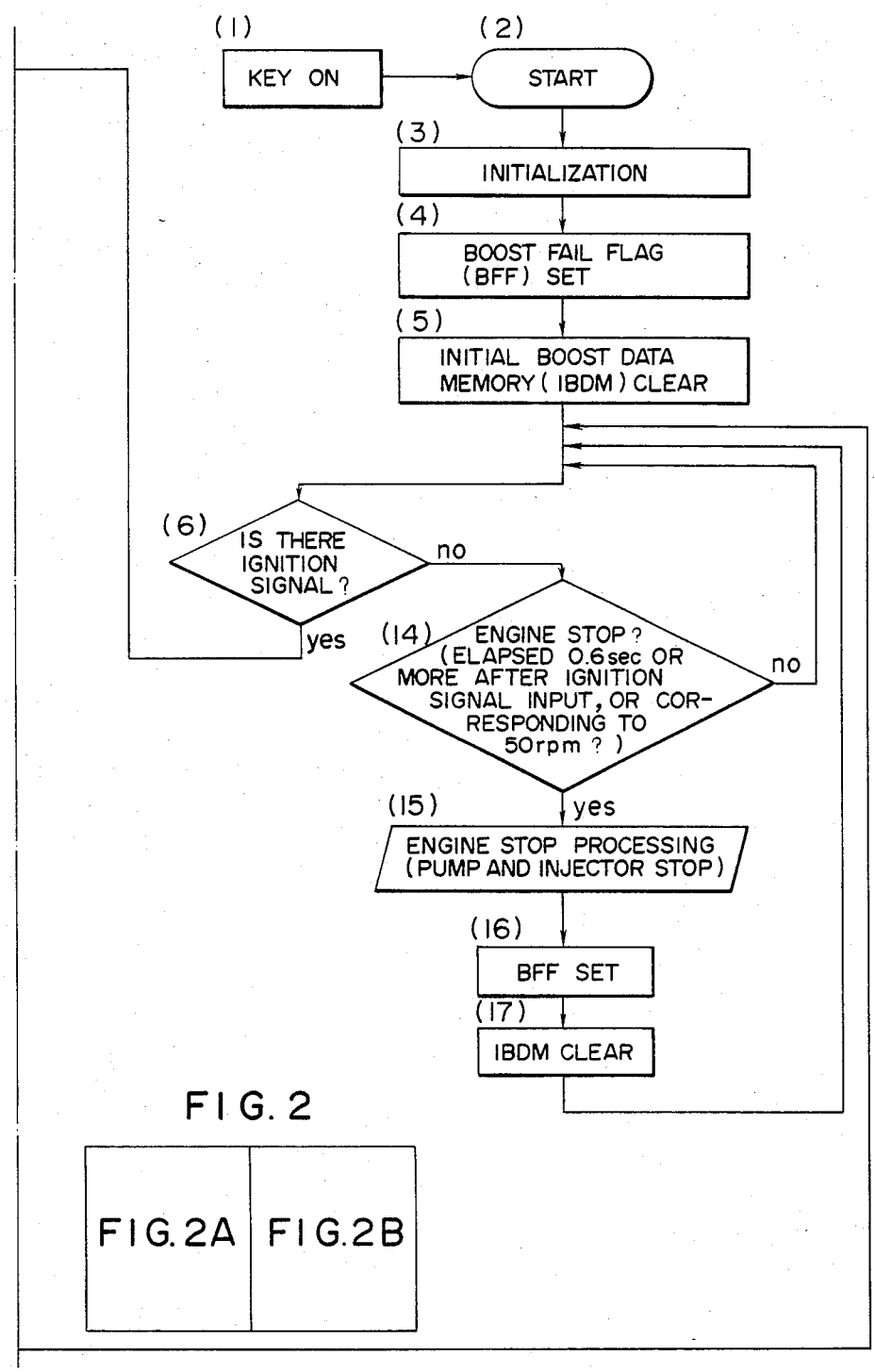

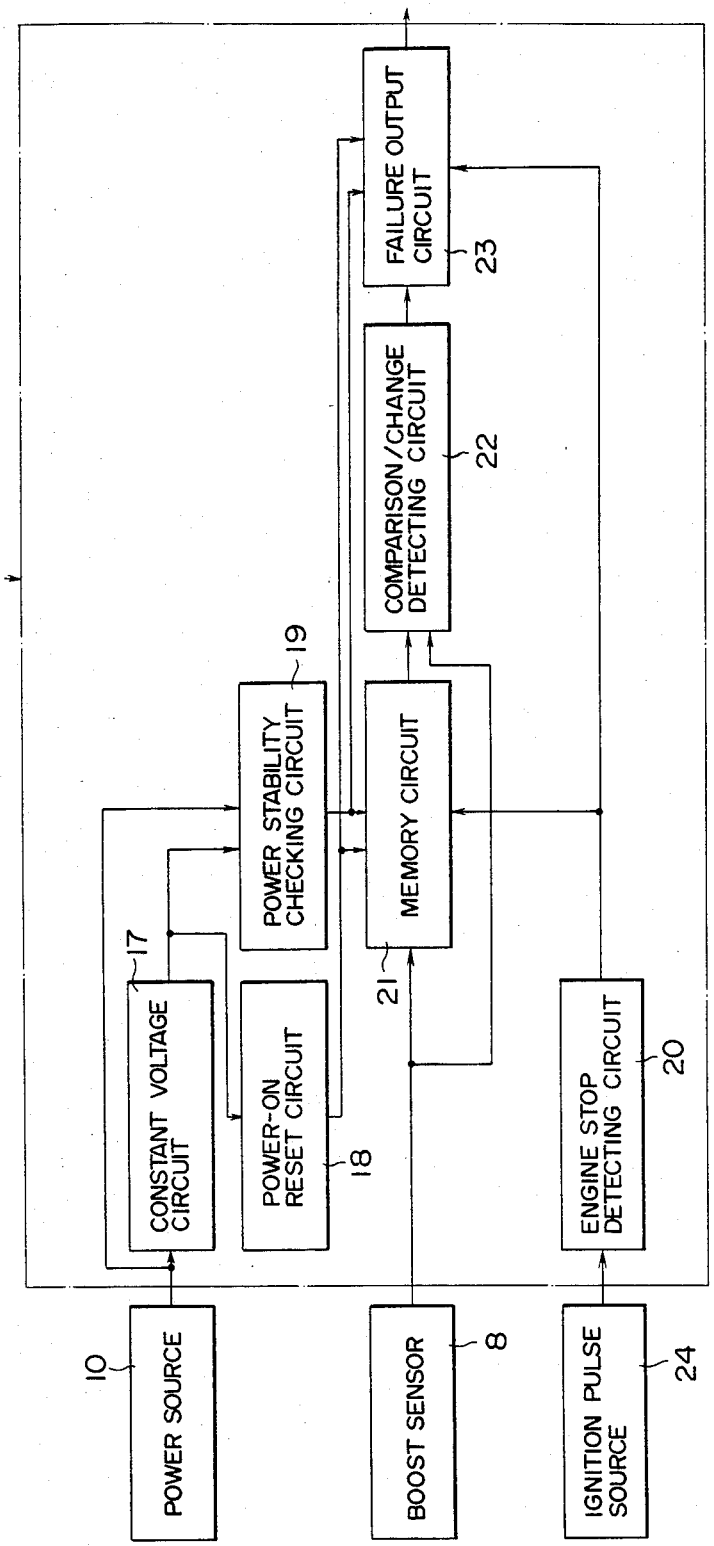
F I G. 4

(a) ST TERMINAL SIGNAL LEVEL
(b) EOC TERMINAL SIGNAL LEVEL
(c) OUT OUTPUT (8-BIT DIGITAL VALUE)

METHOD AND APPARATUS FOR JUDGING THE STATE OF OPERATION OF AN INTAKE PASSAGE PRESSURE DETECTING DEVICE FOR AN ENGINE

BACKGROUND OF THE INVENTION

1. Field of the Invention

The present invention relates to a method and apparatus for judging whether an intake passage pressure detecting device in a fuel feed system for an engine capable of electronically controlling the amount of fuel to be fed is in a state of failure or in normal state.

Heretofore, there has been proposed a fuel feed system capable of electronically controlling the amount of fuel to be fed to an engine on the basis of load information such as the pressure of an intake passage, the degree of opening of a throttle valve or the amount of air suctioned in the intake passage.

2. Description of the Prior Art

In case a device for detecting such load information is in a state of failure, it is necessary to take a measure, for example, to control the feed of fuel on the basis of an information provided from a device in normal operation, and therefore it has been desired to develop means capable of exactly judging whether the device for detecting load information is in a state of failure or not.

SUMMARY OF THE INVENTION

The present invention has been accomplished in view of the above point, and it is the object of the invention to provide a method and apparatus capable of judging whether an intake passage pressure detecting device for an engine is in a state of failure or in a state of normal operation.

For achieving the aforesaid object, the method of the present invention for judging the state of operation of an intake passage pressure detecting device for an engine comprises first considering the intake passage pressure detecting device as being in a state of failure at the time of starting a control which control is a control for the feed of fuel to the engine made on the basis of intake passage pressure detected by the intake passage pressure detecting device, then storing an initial output from the intake passage pressure detecting device at the beginning of the above control, comparing this initial output with a subsequent output from the intake passage pressure detecting device and, in case the difference between the two outputs exceeds a predetermined value, judging that the intake passage pressure detecting device is in a state of normal operation.

Apparatus of the present invention for judging the state of operation of an intake passage pressure detecting device for an engine comprises an intake passage pressure detecting device for an engine for detecting intake passage pressure of the engine, a power-on reset circuit for providing a reset output when power is turned on, a memory circuit capable of storing a value of the intake passage pressure at the beginning of a control for the feed of fuel to the engine upon receipt of signals respectively from the power-on reset circuit and from the intake passage pressure detecting device, a comparison/change detecting circuit for judging whether a relative difference between the initial output of the intake passage pressure detecting device stored in the memory circuit and a subsequent output of the intake passage pressure detecting device is above a predetermined value or not, and a failure output circuit for providing a judged failure output upon receipt of signals respectively from the power-on reset circuit and from the comparison/change detecting circuit.

BRIEF DESCRIPTION OF THE DRAWINGS

The accompanying drawings illustrate embodiments of the present invention, in which:

FIG. 1 is a block diagram of the entire system, and

FIG. 2 composed of FIGS. 2A and 2B is a flowchart for illustration of its function when it is not required to turn off ignition key before restarting engine after stop.

FIG. 2' composed of FIGS. 2'A and 2'B is a flow chart for an engine that cannot be restarted unless the ignition key is once turned off after the engine has stopped.

FIGS. 3 through 14 illustrate an apparatus for practising the method of judging the state of operation of an intake passage pressure detecting device for an engine according to a second embodiment of the present invention, namely:

FIG. 3 is a block diagram of the entire system;

FIG. 4 is a block diagram of a failure detecting circuit;

FIG. 5 is an electric circuit diagram for resetting when power is turned on;

FIG. 6 is an electric circuit diagram for checking the stability of a power source;

FIG. 7 is an electric circuit diagram for detecting engine stop;

FIG. 8 is an electric circuit diagram for detecting cranking;

FIG. 9 is an electric circuit diagram for storing data;

FIG. 10 is an electric circuit diagram for comparison and change detection with respect to data;

FIG. 11 is an electric circuit diagram for failure output;

FIGS. 12, 13(a), (b) and 14(a)-(c) are waveform diagrams illustrating the function of the apparatus.

DESCRIPTION OF THE PREFERRED EMBODIMENTS

Before explaining the apparatus for practicing the method of the present invention, an explanation will be given hereinunder about a fuel feed control system for an engine E.

Figure 1:
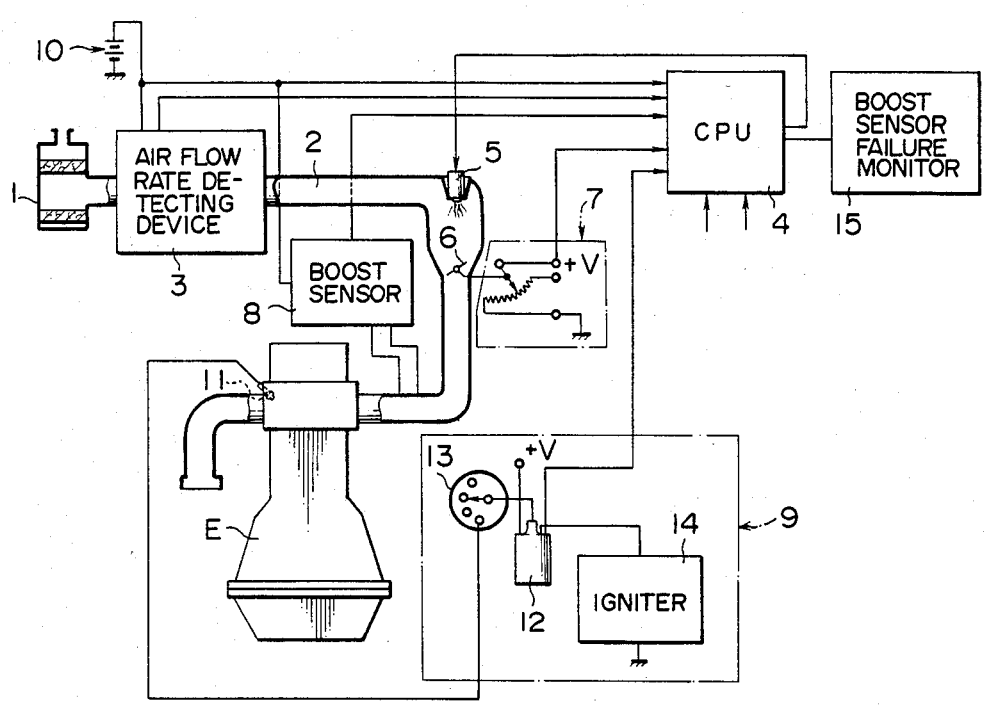
FIGS. 1 and 2 illustrate an apparatus for practising the method of judging the state of operation of an intake passage pressure detecting device for an engine according to a first embodiment of the present invention, namely.

As shown in FIG. 1, an air flow rate detecting device 3 is mounted in an intake passage 2 at a downstream side from an air cleaner 1. The air flow rate detecting device 3 detects the frequency of Karman's vortex street caused by the air flowing through the intake passage 2 and outputs an electric pulse train signal having a frequency proportional to the amount of air suctioned through the intake passage 2, the electric pulse train signal being input to a central processing unit (hereinafter referred to as the CPU). 4 of a digital computer which serves as control means.

From the CPU 4 there is output a pulse train signal which synchronizes with or follows the frequency, or the divided-down frequency of an electric signal provided from the air flow rate detecting device 3, depending on the characteristics of the air flow rate detecting device and the fuel injection valve used, and subsequently from a driver (not shown) connected to the CPU 4 there is output a driving pulse train signal which synchronizes with the above pulse train signal.

Furthermore, in the intake passage 2 at a downstream side from the air flow rate detecting device 3 and at an upstream side from a branch portion of the intake passage 2 there is mounted an electromagnetic fuel injection valve (hereinafter referred to as the "electromagnetic valve") 5 for ejecting fuel into the intake passage 2. The electromagnetic valve 5, which is connected to the CPU 4 through the foregoing driver, is adapted to open or close in synchronism with the driving pulse train signal provided from the driver, thereby allowing fuel to be fed from the electromagnetic valve 5 in proportion to the amount of air flowing through the intake passage 5.

When the engine E is in a special state of operation such as a high-load operation at low speed, there is fear that the air flowing through the intake passage 2 will give rise to fluctuation of air flow whereby the air may temporarily stagnate so that the flow rate detecting device does not detect any air flow, or may even momentarily flow backwards and then again pass the flow rate detecting device so that the device detects an amount of air twice as large as its actual amount.

For such a special state of operation, there is provided other control means capable of controlling the opening and closing of the electromagnetic valve 5 with an electric signal transmitted from means for detecting a special state of operation of the engine E in preference to an electric signal provided from the air flow rate detecting device 3. In this embodiment, the CPU 4 of a digital computer also serves as the other control means just mentioned.

The means for detecting a special state of operation is constituted of a throttle valve opening sensor 7 for detecting the degree of opening of a throttle valve 6 corresponding to the pressure of the intake passage 2, a boost sensor 8 as an intake passage pressure detecting device for detecting a positive or negative pressure of the intake passage 2 (although this sensor is capable of detecting a positive or negative pressure, it is called a boost sensor for the convenience of explanation), and a rotational speed sensor 9 for detecting the rotational speed of the engine E. An electric analog signal provided from each of the sensors 7 and 8 is input to the CPU 4 through an analog/digital converter not shown (hereinafter referred to as the "A/D converter"), while an electric pulse train provided from the sensor 9 is input to the CPU 4 directly.

Thus, informations concerning the intake passage pressure and the rotational speed of the engine E are input to the CPU 4, and on the basis of these informations the CPU 4 judges whether the engine E is now in a special state of operation or in other state of operation (hereinafter referred to as "state of normal operation").

When it has been judged that the engine E is now in a state of normal operation, the electromagnetic valve 5 is opened or closed with a driving pulse train signal which has undergone frequency modulation on the basis of an electric signal provided from the air flow rate detecting device 3, while when the engine E has been judged to be in a special state of operation, the electromagnetic valve 5 is opened or closed with a driving pulse train signal which has undergone frequency modulation on the basis of an electric signal having an information on the rotational speed of the engine E.

In FIG. 1, the reference numeral 10 designates a battery as a power source for the air flow rate detecting device 3, for the boost sensor 8 and for the CPU 4. numeral 11 shows an ignition plug, 12 shows an ignition coil, 13 shows a distributor, and 14 shows an igniter.

There is further provided means for judging whether the boost sensor 8 is in a state of failure or in a state of normal operation. In this embodiment, the CPU 4 also serves as this judging means.

By this judging means, the state of operation of the boost sensor 8 is judged in the following manner.

In control of the feed of fuel to the engine E, when the engine key has been inserted and moved to turn on the power, the boost sensor 8 is regarded as being in a state of failure.

Then, an initial output from the boost sensor 8 just after the application of power is stored and compared with a subsequent output from the boost sensor 8, and in case the difference between the two outputs exceeds a predetermined value, it is judged that the boost sensor 8 is in a state of normal operation, and the initial judgment of failure of the boost sensor 8 is cancelled, while in case the above difference is below the predetermined value, the judgment that the boost sensor 8 is in a state of failure is kept.

The CPU 4 receives information from this judging means and judges whether or not the signal output from the boost sensor 8 is to be used for the fuel feed control.

When it has been judged that the boost sensor 8 is in a state of failure, a boost sensor failure monitor 15 operates to provide indication that the boost sensor 8 is in a state of failure.

According to this judging means, moreover, at the time of engine stop or cranking of the engine E, it is re-judged whether the boost sensor 8 is in a state of failure or in a state of normal operation.

For example, the re-judgement at the time of engine stop is performed in the following manner. At the time of re-start after engine stop, first the boost sensor 8 is regarded as being in a state of failure, then an output of the boost sensor 8 just after the re-start is again stored and this re-stored value is compared with a subsequent boost sensor output, and in case the difference between both outputs exceeds a predetermined value, it is judged that the boost sensor 8 is in a state of normal operation and the initial judgement of failure of the boost sensor 8 is cancelled, while in case the above difference is below the predetermined value, the judgment that the boost sensor 8 is in a state of failure is kept.

Thereafter, in the same way as in the case of engine start previously described, the CPU 4 receives information from this judging means and judges whether the signal output from the boost sensor 8 is to be used or not for the fuel feed control, and the boost sensor failure monitor 15 provides a failure indication when the boost sensor 8 has been judged to be in a state of failure.

Figure 2A:
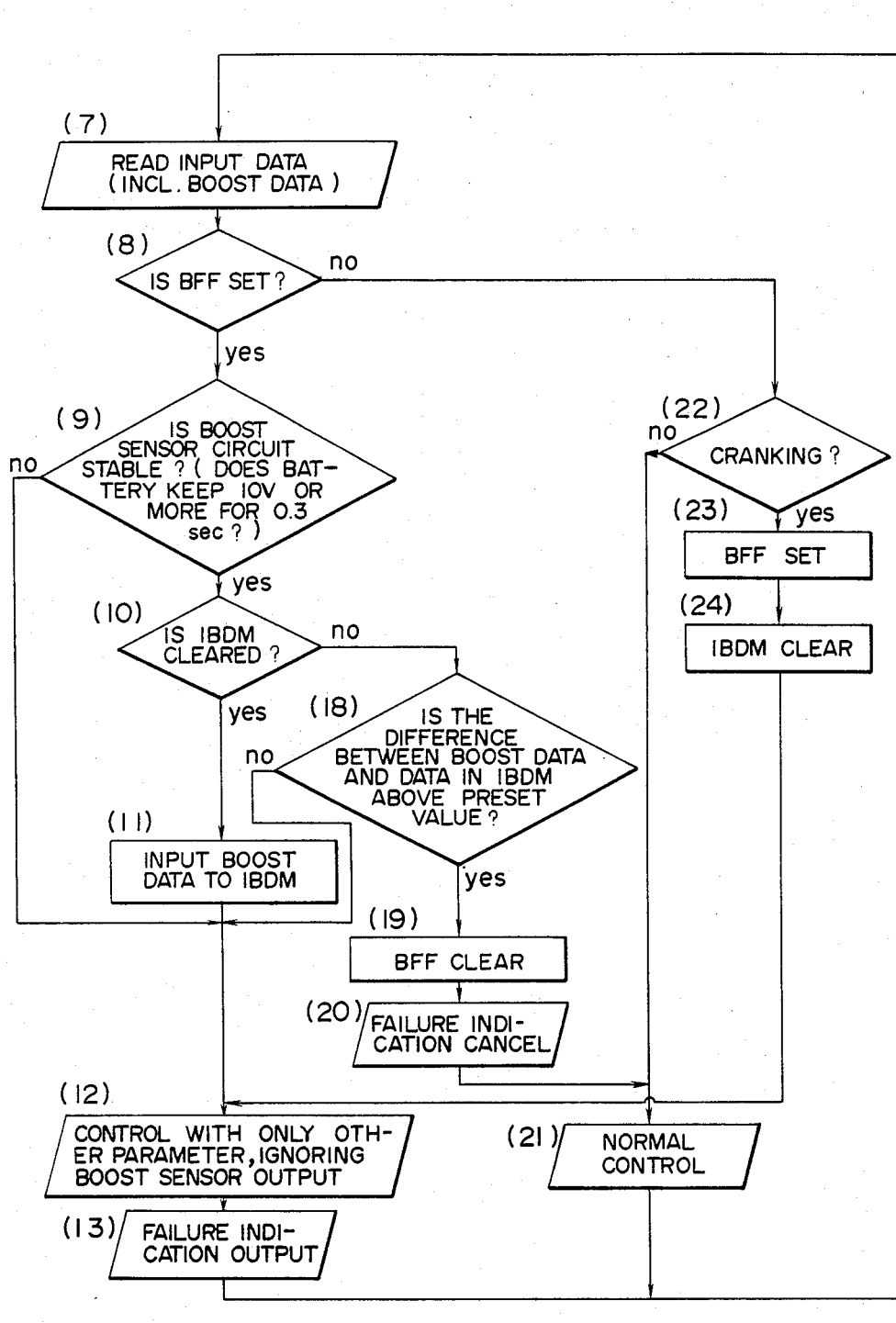

Referring now to FIG. 2, composed of FIG. 2A and FIG. 2B there is shown, in the form of a flowchart, an operation judging process for the boost sensor 8 at the time of the foregoing engine start or re-start.

In the flowchart of FIG. 2, the reference numeral (1) shows a Key ON processing for turning on the power. Numeral (2) shows a Start processing, and numeral (3) shows an Initialization processing for setting the internal state of the CPU 4 to the initial state of program execution.

Numeral (4) shows a Boost Sensor Failure Flag (Boost Fail Flag; BFF) Set processing whereby the boost sensor 8 is regarded as being in a state of failure at the time of start of the control.

Numeral (5) shows an Initial Boost Data Memory (IBDM) Clear processing, and numeral (6) shows a Judgment processing for judging whether an ignition signal is present or not; if an ignition signal is present, the processing (6) follows the path "yes", and if an ignition signal is not present, the processing (6) follows the path "no".

Numeral (7) shows a Read processing for input data (including boost data) provided from the boost sensor 8, and numeral (8) shows a Judgment processing for judging whether BFF is in a set state or not; if the boost sensor 8 is in a state of failure, the processing (8) follows the path "yes", and if the boost sensor 8 is in a state of normal operation, the processing (8) follows the path "no".

Numeral (9) shows a Judgment processing for judging whether the boost sensor circuit is stable or not and, more concretely, for judging whether the voltage of the battery 10 keeps 10 volts or more for a period of at least 0.3 second, and this is because, unless the voltage of the battery 10 is above a certain value, for a period of a certain time, the output of the boost sensor 8 varies, so this processing (9) aims at checking it. If the boost sensor circuit is stable, the processing (9) follows the path "yes", and if the boost sensor circuit is not stable, the processing (9) follows the path "no".

Numeral (10) shows a Judgment processing for judging whether IBDM is in a cleared state or not, and numeral (11) shows a processing for inputting boost data into IBDM. By the processing (11) there is stored the initial output provided from the boost sensor 8 at the beginning of the control.

Numeral (12) shows a processing for generating a signal indicating that the control is to be made with only other parameter such as the degree of opening of the throttle valve and so on while ignoring the output of the boost sensor 8. By this processing (13), the boost sensor failure monitor 15 operates to provide a failure indication.

Numeral (14) shows a Judgment processing for judging whether the engine is in a stopped state and, more concretely, for judging whether 0.6 second or more has elapsed after input of an ignition signal, or whether the rotational speed of the engine corresponds to 50 rpm or not. In the case of engine stop, the processing (14) follows the path "yes", and in case the engine is not stopped, the processing (14) follows the path "no".

Numeral (15) shows an Engine Stop processing whereby the operation of the pump and that of the electromagnetic valve 5 are stopped.

Numeral (16) shows a BFF Set processing whereby the boost sensor 8 is regarded as being in a state of failure at the time of re-start after engine stop.

Numeral (17) shows an IBDM Clear processing whereby a pre-processing is performed for re-storing the initial output provided from the boost sensor 8 just after restart of the engine.

The processings (16) and (17) aim at making re-start possible even without once turning off the engine key.

Numeral (18) shows a Judgment processing for judging whether a relative difference between the intra-IBDM data (initial output value from the boost sensor 8) and the boost data (subsequent boost sensor output) is above a predetermined value or not. If this difference exceeds the predetermined value, the processing (18) follows the path "yes", and if it is below the predetermined value, the processing (18) follows the path "no".

Numerals (19) and (20) show a BFF Clear processing and a Failure Indication Cancelling processing, respectively, and by these processings (19) and (20) the initial judgment of failure of the boost sensor 8 is cancelled and the failure indication by the boost sensor failure monitor 15 is also cancelled.

Numeral (21) shows a processing for generating a signal which indicates that a normal control is to be made, and by this processing (21) the boost data provided from the boost sensor 8 are also used for the control in the CPU 4.

Numeral (22) shows a Judgment processing for judging whether cranking is taking place or not. While the self-starting motor is rotated, the processing (22) follows the path "yes", and when it is not rotated, the processing (22) follows the path "no".

Numerals (23) and (24) show a BFF Set processing and an IBDM Clear processing, respectively, and the object of these processings (23) and (24) is the same as the foregoing processings (16) and (17), that is, re-start is to be made possible even without once turning off the engine key.

In the flowchart hereinabove explained, the process wherein the boost sensor 8 is judged to be in a state of normal operation at the time of engine start is shown using processing numbers as follows: (1)→(2)→(3)→(4) (the boost sensor 8 is regarded as being in a state of failure)→(5)→(6)→(7)→(8)→(9)→(10)→(11)(initial output just after engine start is stored)→(12) (minimum operation is ensured)→(13)→(6)→(7)→(8)→(9)→(10)→(18)→(19)→(20)→(21). Thereafter, in case the boost sensor 8 is in a state of normal operation, the loop of (21)→(6)→(7)→(8)→(22)→(21) is further repeated.

On the other hand, in case the boost sensor 8 is in a state of failure, the same judgment process as above is applied beginning with the processing (1) up to the processing (18), but as the subsequent process there is repeated the loop of (18)→(12) (minimum operation is ensured)→(13)→(6)→(7)→(8)→(9)→(10)→(18).

The process wherein the boost sensor 8 is judged to be in a state of normal operation at the time of engine re-start is, in the case of re-start after engine stop, as follows: (14)→(15)→(16) (the boost sensor 8 is regarded as being in a state of failure)→(17)→(6)→(7)→(8)→(9)→(10)→(11) (initial output just after engine re-start is stored)→(12) (minimum operation is ensured)→(13)→(6)→(7)→(8)→(9)→(10)→(18)→(19)→(20)→(21). Thereafter, in case the boost sensor 8 is in a state of normal operation, the loop of (21)→(6)→(7)→(8)→(22)→(21) is further repeated.

On the other hand, in case the boost sensor 8 is in a state of failure at the time of re-start after engine stop, the same judgment process as above is applied beginning with (14) up to (18), but as the subsequent process there is repeated the loop of (18)→(12) (minimum operation is ensured)→(13)→(6)→(7)→(8)→(9)→(10)→(18).

Furthermore, when BFF is not set, the process wherein the boost sensor 8 is judged to be in a state of normal operation at the time of re-start of the self-starting motor is as follows: (22)→(23) (the boost sensor 8 is regarded as being in a state of failure)→(24)→(12) (minimum operation is ensured)→(6)→(7)→(8)→(9)→(10)→(11) (initial output just after engine re-start is stored)→(12) (minimum operation is ensured)→(13)→(6)→(7)→(8)→(9)→(10)→(18)→(19)→(20)→(21). Thereafter, if the boost sensor 8 is in a state of normal operation, the loop of (21)→(6)→(7)→(8)→(22)→(21) is repeated.

During this re-start cranking, if the boost sensor 8 is in a state of failure, the same judgment process as above is applied beignning with (22) up to (18), but as the subsequent process there is repeated the loop of (18)→(12) (minimum operation is ensured)→(13)→(6)→(7)→(8)→(9)→(10)→(18).

The fuel feed system for an engine including the above judging means has the following features.

(1) At the time of starting the operation of the system (when power is turned on), the boost sensor 8 is regarded as being in a state of failure, then an output value from the boost sensor 8 at the beginning of the operation is stored and a subsequent output of the boost sensor is compared with the stored output value, and in case the difference between the two outputs is above a preset amount of variation, it is judged that the boost sensor 8 is in a state of normal operation, and during the period from the aforesaid start of operation until the judgment of normal operation is given, the control relying on the boost sensor output is stopped.

(2) When the engine E has stopped, or at the time of cranking, the boost sensor 8 is regarded as being in a state of failure, then an output value from the boost sensor at the beginning of engine re-start is again stored and a subsequent boost sensor output is compared with the re-stored output value, and in case the difference between the two output values is above the aforesaid preset amount of variation, it is judged that the boost sensor 8 is in a state of normal operation, and during the period from engine stop until the judgment of normal operation is given, the control relying on the boost sensor output is stopped.

(3) The storing of the boost sensor output is performed upon confirming that the supply voltage is a voltage capable of guaranteeing the operation of the boost sensor 8.

(4) While the control relying on the boost sensor output is stopped, the control for the engine E is made using other parameters capable of representing load such as the degree of opening of the throttle valve or the output of the air flow rate detecting device.

(5) While the boost sensor 8 is regarded as being in a state of failure, the boost sensor failure monitor 15 is operated.

Thus, it is possible to judge exactly whether the boost sensor 8 is in a state of failure or in a state of normal operation, so a fuel feed control of high reliability is attainable.

FIG. 2' composed of FIGS. 2'A and 2'B shows a modification of the flow chart of FIG. 2 for an engine of the type which, after stopping, cannot be re-started unless the engine key is first turned off. In the flow chart of FIG. 2'A the procedures (22), (23), and (24) are omitted and instead a path (26) is provided. In the flow chart of FIG. 2'B, the procedures (16) and (17) are omitted and replaced by path (25). In the case of FIGS. 2'A and 2'B the Boost Fail Flag Set and Initial Boost Data Memory Clear are processed only at items (4) and (5) soon after the Key On (1) step.

Method and apparatus for judging the state of operation of an intake passage pressure detecting device for an engine according to a second embodiment of the present invention will be described hereinunder with reference to FIGS. 3 through 14.

Figure 3:
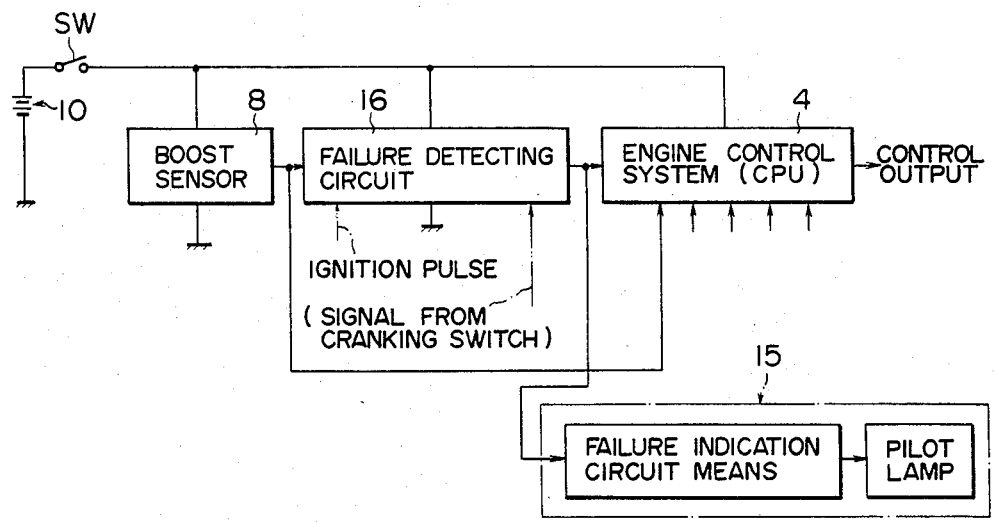

In this second embodiment, as shown in FIG. 3, a failure detecting circuit 16 is provided separately from the CPU 4 as means for judging whether the boost sensor 8 is in a state of failure or in a state of normal operation, and this circuit 16, as shown in FIG. 4, is constituted of a constant voltage circuit 17, a power-on reset circuit 18, a power stability checking circuit 19, an engine stop detecting circuit 20, a memory circuit 21, a comparison/change detecting circuit 22 and a failure output circuit 23.

The constant voltage circuit 17 outputs the voltage fed from the battery power source 10 as a constant voltage value, and its output voltage $V_{CC}$ is fed to the circuits 18 through 23.

Figure 5:
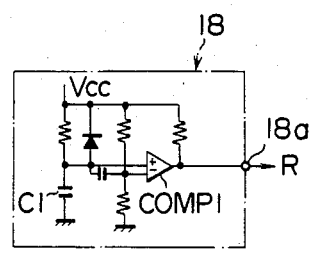

The power-on reset circuit 18 generates a reset output R when power is applied (at the time of switch ON of the engine key) and this output R is fed to the memory circuit 21 and to the failure output circuit 23. The circuit configuration of the power-on reset circuit 18 is as shown in FIG. 5.

Figure 12:
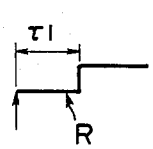
Figure 13:
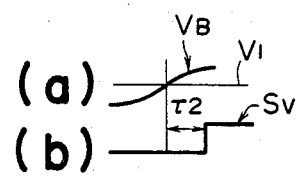
Figure 14:
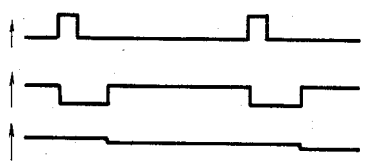

In the power-on reset circuit 18, by utilizing a delayed rise of a plus input terminal signal of a comparator COMP1 based on the capacity of a capacitor $C_1$ at the time of rise of the constant voltage signal $V_{CC}$ fed from the constant voltage circuit 17, there is produced from its output terminal 18a an output R of low level (hereinafter referred to as "L level") having a constant time $\tau 1$ as shown in FIG. 12.

Figure 6:
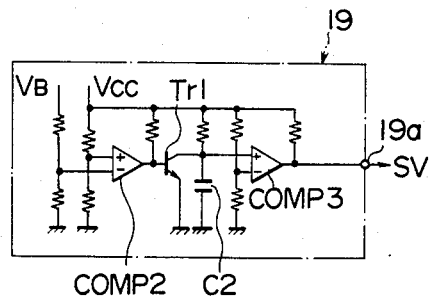

The power stability checking circuit 19 receives a voltage signal $V_B$ from the battery 10 and the constant voltage signal $V_{CC}$ from the constant voltage circuit 17, and provides from its output terminal 19a an output SV of high level (hereinafter referred to as "H level") when the power is stable, and provides the output SV of L level when the power is not stable. Its circuit configuration is as shown in FIG. 6.

In the power stability checking circuit 19, suitably divided potentials of the voltage signals $V_{CC}$ and $V_B$ are fed to plus and minus input terminals of a comparator COMP2, respectively, and when the voltage signal $V_B$ becomes larger than a voltage V1 capable of guaranteeing the operation of the boost sensor 8, the output of the comparator COMP2 becomes L level.

Once the output of the comparator COMP2 becomes L level, a transistor Tr1 turns off, whereupon a capacitor C2 begins to charge, and after the lapse of a certain time $\tau 2$ (the time required for the internal circuit of the boost sensor to become stable) the output of a comparator COMP3 becomes H level thereby allowing the output SV of H level to be provided from the output terminal 19a [see FIG. 13(a), (b)].

When the voltage signal $V_B$ becomes smaller than the aforesaid guarantee voltage V1, the output of the comparator COMP2 becomes H level and the transistor Tr1 turns on, thus allowing the capacitor C2 to discharge immediately, so that the output of the comparator COMP3 becomes L level and the stability checking is made again from the initial state.

Figure 7:
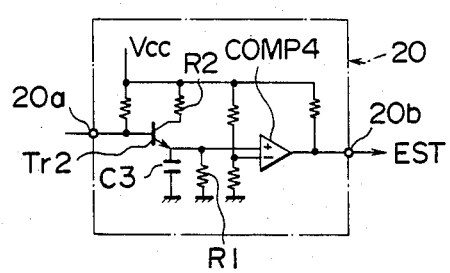

The engine stop detecting circuit 20 receives through its input terminal 20a a signal from an ignition pulse source 24 which performs waveform shaping for an ignition signal and provides a shaped output, and when the engine is stopped, the circuit 20 produces an output EST of L level from its output terminal 20b, while when the engine is not stopped, the circuit 20 produces an output EST of H level from its output terminal 20b. Its circuit configuration is as shown in FIG. 7.

In the engine stop detecting circuit 20, a pulse obtained by waveform shaping an ignition signal and becoming H level for a certain period of time at every ignition signal is fed to its input terminal 20a, whereby at every ignition signal a transistor Tr2 turns on, thus allowing a capacitor C3 to be charged for a certain period of time through a resistor R2, while during the period between ignition signals the signal to the input terminal 20a becomes L level, the transistor Tr2 turns off and the capacitor C3 discharges through a resistor R1. Therefore, if no ignition signal is fed for a while, the potential of the capacitor C3 drops and the output of a comparator COMP4 becomes L level.

As a result, at the output terminal 20b there is obtained the output EST of H level when the rotational speed of the engine E is above a predetermined value, and the output EST of L level is available when such rotational speed is below the predetermined value; for example, assuming that the predetermined value is 50 rpm, engine speeds below 50 rpm are judged to be engine stop and the output EST of L level is obtained at the output terminal 20b.

Figure 9:
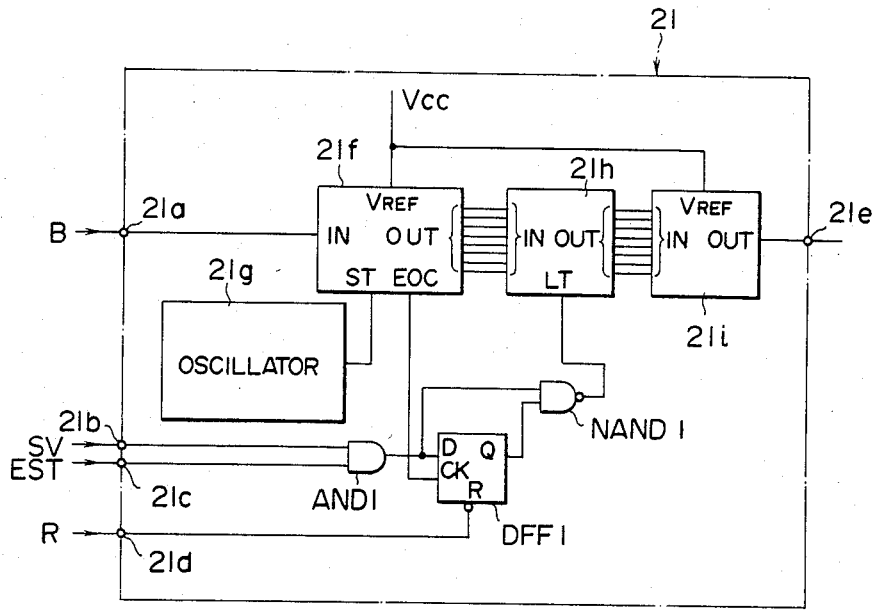

In the memory circuit 21, the boost sensor output B, the power stability checking circuit output SV, the engine stop detecting circuit output EST and the power-on reset circuit output R are fed to input terminals 21a, 21b, 21c and 21d, respectively while an output from an output terminal 21e is fed to an input terminal 22a of the comparison/change detecting circuit 22. The circuit configuration of the memory circuit 21 is as shown in FIG. 9.

An A/D converter 21f in the memory circuit 21 returns its EOC output to L level at every rise of its ST input, compares the voltage at its IN terminal with the output $V_{CC}$ which is input to a terminal $V_{REF}$ and converts it to a digital value, then puts this digital value on its OUT line as an 8-bit parallel output and at the same time generates a conversion end signal of H level at its EOC terminal. The OUT and EOC outputs do not change until the next rise of ST input. To the ST terminal there is fed a pulse with a suitable period from an oscillator 21g.

In a latch 21h, when the signal to its LT terminal is H level, both input and output are of the same value and the latch 21h allows input to pass therethrough without stopping, and when the signal to the LT terminal changes to L level, the latch 21h holds the input at the time of fall on its output side, and the output does not change until the signal to the LT terminal again changes to H level.

A digital/analog converter (hereinafter referred to as the "D/A converter") 21i compares the 8-bit digital value at its IN terminal with the voltage $V_{CC}$ at its $V_{REF}$ terminal and converts it to an analog value, with its output varying in immediate response to changes at its IN terminal.

FIG. 14(a) through (c) show how the ST terminal signal level, the EOC terminal signal level and OUT output change.

An AND gate AND1 is constructed so that if at least one of the signals SV and EST is at L level, the output of AND1 becomes L level. A NAND gate NAND1 is constructed so that if either the output level of AND1 or that of a D-flip flop DFF1 is at least L level, the output of NAND1 becomes H level.

When the signal R fed to R terminal is L level, the D-flip flop DFF1 produces L level output, and when the R input is H level, the DFF1 outputs a D input (output of the AND gate AND1) at the time of rise of its CK input or EOC output of the A/D converter 21f, from its Q output.

During reset, therefore, the R input becomes L level, and the output of the D-flip flop DFF1 and that of the NAND gate NAND1 become L and H levels, respectively, so that the latch 21h allows input to pass therethrough.

And after reset, until the signal SV becomes H level (the boost power becomes stable) while the engine E is rotating (the signal EST is H level), the output of the AND gate AND1 and that of the NAND gate NAND1 are L and H levels, respectively, so that the latch 21h allows input to pass therethrough.

Next, when the signals EST and SV both become H levels, the A/D converter 21f digitizes boost data upon next input to the ST terminal, and at the time when the conversion end signal is input from the EOC terminal to the D-flip flop DFF1, the latter and the AND gate AND1 both become H output level, and the output of the NAND gate NAND1 becomes L level, so that latch 21h holds the boost data at that moment, and the output of the D/A converter 21i holds boost data at a later time of either just after power became stable or just after engine start.

In the case of engine stop, the AND gate AND1 becomes L level and the latch 21h is released, then after re-start of the engine, the value just after the re-start is held again.

Also in the case of lowering of power, the AND gate AND1 becomes L level and the latch 21h is released, then the value after re-stabilization of the power source 10 is held again.

Figure 10:
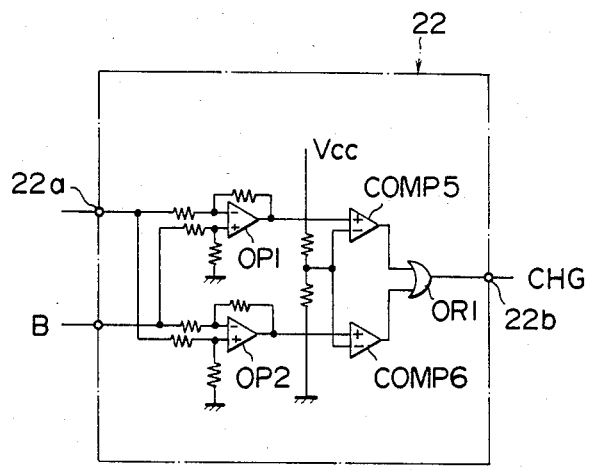

The comparison/change detecting circuit 22 outputs a signal CHG of H level from its output terminal 22b when a relative difference between the initial output from the boost sensor 8 and a subsequent output therefrom is above a predetermined value, and outputs a L level signal CHG from its output terminal 22b when the above relative difference is below the predetermined value. The circuit configuration of the comparison/change detecting circuit 22 is as shown in FIG. 10.

In this circuit 22, operational amplifiers (hereinafter referred to as "OP amp.") OP1 and OP2 perform subtractions in opposite directions for the output of the D/A converter 21i and the output of the boost sensor 8, and comparators COMP5 and COMP6 respectively compare the substraction results of the OP amp. OP1 and OP2 with a predetermined level.

The OP amp. OP1 performs the operation of (boost output)−(D/A converter output), while the OP amp. OP2 performs the counter operation.

When the difference between the output of the D/A converter 21i and the boost sensor output exceeds a predetermined value, either the OP amp. OP1 or OP2 outputs a larger voltage than the common reference potential of the comparators COMP5 and COMP6, so that the output of either COMP5 or COMP6 becomes H level and consequently the output of an OR gate OR1 becomes H level.

By combining the comparison/change detecting circuit 22 with the memory circuit 21, therefore, while the latch 21h allows input to pass therethrough, there exists only a slight difference based on the circuit processing time between the output of the D/A converter 21*i* and the boost sensor output, and therefore the output CHG of the OR gate OR1 becomes L level.

When the latch 21*h* comes into a holding state and the change in boost data from the held value is above a predetermined value, the output CHG becomes H level, while when such change is below the predetermined value, the output CHG becomes L level.

Figure 11:
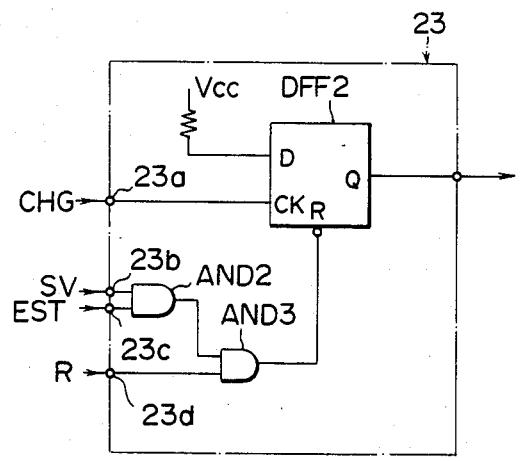

The failure output circuit 23 receives the comparison/change detecting circuit output CHG, the power stability checking circuit output SV, the engine stop detecting circuit output EST and the power-on reset circuit output R respectively at its input terminals 23*a*, 23*b*, 23*c* and 23*d*, and outputs a failure output. Its circuit configuration is as shown in FIG. 11.

In the failure output circuit 23, a D-flip flop DFF2 is reset and its output becomes L level when the output level of an AND gate AND3 is L level. That is, when one of the signals SV, EST and R becomes L level through AND 2 and AND3, the D-flip flop DFF2 is reset and its output becomes L level.

At the leading edge of the first signal CHG after release of the reset (after the output of AND3 became H level), a D input (with its level fixed to H level) is output to a Q terminal, so that the output of DFF2 becomes H level, and even if the signal CHG later changes, the output continues to be H level since the D input is fixed to H level, and this state continues until any one of the signals SV, EST and R becomes L level.

Figure 8:
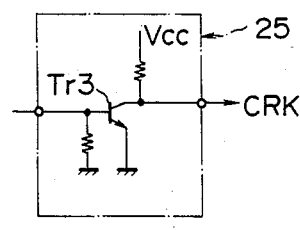

The engine stop detecting circuit 20 may be substituted by such a cranking detecting circuit 25 as shown in FIG. 8, which is constructed so that upon cranking switch ON or self-starting motor ON, a transistor Tr3 turns on and its output CRK becomes L level.

The following description is now provided about the operation procedure of the apparatus of the present invention.

(1) First, upon application of power, the output R of the power-on reset circuit 18 becomes L level for a short time, the latch 21*h* is released and the D-flip flop DFF 2 is reset (the output of DFF 2 is L level), and thus a failure state is set.

(2) After the signal R became H level, until the power source 10 is stabilized, the power stability checking circuit output SV becomes L level, the latch 21*h* is still released and the D-flip flop DFF2 continues to be reset (the output of DFF 2 is L level).

(3) When the signal SV became H level, since the signal EST is H level unless the engine is stopped (or cranking), the latch 21*h* comes into a holding state and boost data is held in the output of the D/A converter 21*i*.

If the signal EST (or CRK) is L level, data holding is effected in the same manner upon completion of engine start.

At the same time, the reset of the D-flip flop DFF2 is released and a change in the signal CHG is waited for.

(4) Thereafter, when the boost sensor output B exhibits a change above the predetermined value, the signal CHG becomes H level, and in synchronization with its rise the output of the D-flip flop DFF2 becomes H level, so the state of failure is cancelled. This state continues as long as the vehicle driving is continued and does not return to the failure state.

(5) When re-starting after engine stop based on some cause or other, the signal EST (or CRK) becomes L level at the time of engine stop (or cranking), the latch is released, the D-flip flop DFF 2 is reset, and the state of failure is resumed.

(6) After re-start of the engine, the state shown in the paragraph (3) is resumed, and again when the boost sensor output B exhibits a change above the predetermined value, the state of failure is cancelled.

In case the apparatus of the present invention is applied to an engine of the type which cannot be restarted unless the engine key is once turned off, the circuit simplification is attainable by omitting the engine stop detecting circuit 20 (or the cranking detecting circuit 25) and the AND gates AND1, AND2, and in this case the signal SV is directly fed to the D terminal of the D-flip flop DFF1 and to the input terminal of the AND gate AND3.

In the first embodiment previously described, the reading and storing of boost data synchronize with ignition signal input, while in this second embodiment they synchronize with fixed period pulses provided from the oscillator 21*g*.

According to the method of the present invention for judging the state of operation of an intake passage pressure detecting device for an engine, as set forth hereinbefore, when controlling the feed of fuel to the engine on the basis of the intake passage pressure detected by the intake passage pressure detecting device, this detecting device is regarded as being in a state of failure at the time of start of the above control, then the initial output from the intake pressure detecting device at the beginning of the above control is stored, thereafter a subsequent output from the intake pressure detecting device is compared with the above initial output, and in case the difference between both outputs exceeds a predetermined value, it is judged that the intake passage pressure detecting device is in a state of normal operation. Consequently, the state of operation of the above intake passage pressure detecting device can be judged with high reliability whereby the reliability of the entire system can be largely improved, thus resulting in that a highly reliable fuel feed control is attainable.

According to the apparatus of the present invention for judging the state of operation of an intake passage pressure detecting device for an engine, moreover, with a mere simple circuit configuration, the state of operation of the intake passage pressure detecting device can be judged with high reliability whereby, like the method of the present invention, the reliability of the entire system is greatly improved.

What is claimed is:

1. An apparatus for judging the state of operation of an intake passage pressure detecting device for an engine, comprising:

an intake passage pressure detecting device for an engine for detecting an intake passage pressure of the engine, a power-on reset circuit for providing a reset output when power is turned on, a memory circuit for storing an initial output value from said intake passage pressure detecting device at the beginning of a fuel feed control (for the feed of fuel to the engine) upon receipt of signals respectively from said power-on reset circuit and from said intake passage pressure detecting device, a comparison/change detecting circuit for judging whether a relative difference between said initial output value of said intake passage pressure detecting device stored in said memory circuit and a subsequent output value of said intake passage pressure detecting device is above a predetermined value or not, and a failure output circuit which (for providing a judge failure output) upon receipt of signals (respectively) from said power-on reset circuit and said comparison/change detecting circuit, outputs a failure signal which represents that said intake passage pressure detecting device is in a state of failure during the period from the beginning of the fuel feed control until said relative difference is judged by said comparison change detecting circuit to be above said predetermined value and outputs a failure cancellation signal which represents that said intake passage pressure detecting device is in a state of normal operation after said relative difference is judged by said comparison/change detecting circuit to exceed said predetermined value.

2. An apparatus according to claim 1, further comprising a power stability checking circuit for checking whether or not a power source is stable and feeding to said memory circuit and also to said failure output circuit a high level signal when said power source is found unstable and a low level signal when said power supply is found stable, both of said signals serving as trigger signals.

3. An apparatus according to claim 2, wherein said power stability checking circuit includes a comparator for comparing between a voltage value from said power source and a voltage value from a constant voltage source.

4. An apparatus according to claim 2, wherein said memory circuit includes a latch circuit which, using a signal from said power stability checking circuit as a trigger signal, stores said initial output value provided from said intake passage pressure detecting device at the beginning of the fuel feed control and outputs said initial output value.

5. An apparatus according to claim 2, wherein said memory circuit includes an oscillator for controlling the timing for storing the output of said intake passage pressure detecting device.

6. An apparatus according to claim 2, wherein said failure output circuit include a flip-flop circuit which uses a signal from said power stability checking circuit as a trigger signal, and which outputs said failure signal during the period from the beginning of the fuel feed control until said relative difference is judged by said comparison/change detecting circuit to be above said predetermined value and outputs said failure cancellation signal after said relative difference is judged by said comparison/change detecting circuit to exceed said predetermined value.

7. An apparatus according to claim 1, further comprising an engine stop detecting circuit for judging from an ignition signal whether the engine is off or not, the output of said engine stop detecting circuit being fed as a control signal to said memory circuit and also to said failure output circuit which, upon receiving from said engine stop detecting circuit a control signal which represents that the engine is off, outputs a failure signals which represents that said intake passage pressure detecting device is in a state of failure.

8. An apparatus according to claim 7, wherein said failure output circuit includes a flip-flop circuit which uses a signal from said engine stop detecting circuit as a trigger signal, and which outputs said failure signal during the period from the beginning of the fuel feed control until said relative difference is judged by said comparison/change detecting circuit to be above said predetermined value and outputs said failure cancellation signal after said relative difference is judged by said comparison/change detecting circuit to exceed said predetermined value.

9. An apparatus according to claim 7 wherein said memory circuit includes a latch circuit which, using a signal from said engine stop detecting circuit as a trigger signal, stores said initial output value provided from said intake passage pressure detecting device at the beginning of the fuel feed control and outputs said initial output value.

10. An apparatus according to claim 7, wherein said memory circuit includes an oscillator for controlling the timing for storing the output of said intake passage pressure detecting device.

11. An apparatus according to claim 1, further comprising a cranking detecting circuit for judging from the state of operation of a self-starting motor whether the engine is in a state of cranking or not, the output of said cranking detecting circuit being fed as a control signal to said memory circuit and also to said failure output circuit which, upon receiving from said cranking detecting circuit a control signal which represents that the engine is in a state of cranking, outputs a failure signal which represents that said intake passage pressure detecting device is in a state of failure.

12. An apparatus according to claim 11, wherein said memory circuit includes a latch circuit which, using a signal from said cranking detecting circuit as a trigger signal, stores said initial output value provided from said intake passage pressure detecting device at the beginning of the fuel feed control and outputs said initial output value.

13. An apparatus according to claim 11, wherein said memory circuit includes an oscillator for controlling the timing for storing the output of said intake passage pressure detecting device.

14. An appartus according to claim 11, wherein said failure output circuit includes a flip-flop circuit which uses a signal from said cranking detecting circuit as a trigger signal, and which outputs said failure signal during the period from the beginning of the fuel feed control until said relative difference is judged by said comparison/change detecting circuit to be above said predetermined value and outputs said failure cancellation signal after said relative difference is judged by said comparison/change detecting circuit to exceed said predetermined value.

15. An apparatus according to claim 1, wherein said memory circuit includes a latch circuit which, using a signal from said power-on reset circuit (made) as a (control) trigger signal, stores said initial output value provided from said intake passage pressure detecting device at the beginning of the fuel feed control and outputs said initial output value.

16. An apparatus according to claim 1, wherein said memory circuit includes an oscillator for (deciding) controlling the timing for storing the output of said intake passage pressure detecting device.

17. An apparatus according to claim 1, wherein said failure output circuit includes a flip-flop circuit which uses a signal from said power-on reset circiut as a trigger signal, and which outputs said failure signal during the period from the beginning of the fuel feed control until said relative difference is judged by said comparison/change detecting circuit to above said predetermined value and outputs said failure cancellation signal after said relative difference is judged by said comparison/change detecting circuit to exceed said predetermined value.

18. An apparatus according to claim 1, further comprising indicator means for indicating the state of failure of said intake passage pressure detecting device upon receipt of said failure signal or failure cancellation signal from said failure output circuit.

19. A method of judging the state of operation of an intake passage pressure detecting device for an engine which is equipped with first control means controlling fuel feed based on the output from said intake passage pressure detecting device and second control means controlling fuel feed based on the outputs from other sensors which sense engine operation factors other than the intake passage pressure, comprising:
  a first step in which said intake passage pressure detecting device is considered to be in a state of failure at the time of starting the fuel feed control,
  a second step in which an initial output from said intake passage pressure detecting device at the beginning of the fuel feed control is stored,
  a third step in which said initial output is compared with a subsequent output from said intake passage pressure detecting device, and
  a fourth step in which the control by said first control means is inhibited and fuel feed is controlled by said second control means during the period from the start of the fuel feed control until the difference between said initial output and said subsequent output exceeds a preset value, while fuel feed is controlled by said first control means after said difference exceeds said preset value.

20. A method according to claim 19, further comprising:
  a fifth step, in which said intake passage pressure detecting device is considered to be in a state of failure when the engine stops after said first control means has started the fuel feed control,
  a sixth step, in which an initial output from said intake passage pressure detecting device is stored at the time of resumption of the engine operation,
  a seventh step, in which said initial output is compared with a subsequent output from said intake passage pressure detecting device, and
  an eighth step, in which the control by said first control means in inhibited and fuel feed is controlled by said second contrl means during the period from the time when the engine stops until the time when the difference between said initial output and said subsequent output exceeds a preset value, while fuel feed is controlled by said first control means after said difference exceeds said preset value.

21. A method of judging the state of operation of an intake passage pressure detecting device according to claim 19, in which:
  in said first step, said intake passage pressure detecting device is regarded as being in a state of failure also at the time of cranking,
  in said second step, an initial output from said intake passage pressure detecting device at the beginning of the fuel feed control is stored,
  in said third step, said initial output is compared with a subsequent output from said intake passage pressure detecting device, and
  in said fourth step, the control by said first control means is inhibited and fuel feed is controlled by said second control means also during the period from the time of cranking until the time when the difference between said initial output and said subsequent output exceeds a preset value while fuel feed is controlled by said first control means after said difference exceeds said preset value.

22. A method according to claim 19, wherein the storing of the output from said intake passage pressure detecting device is performed only upon confirming that a power supply voltage necessary for ensuring the stable operation of said intake passage pressure detecting device has been supplied for at least a predetermined period.

23. A method according to claim 19, wherein said second control means comprises means responsive to the output from a throttle valve opening sensor and/or an air flow rate detecting device.

24. A method according to claim 19, further comprising a failure monitor for said intake passage pressure detecting device operating while said intake passage pressure detecting device is considered to be in a state of failure.

25. A method according to claim 19, wherein the storing of the output of said intake passage pressure detecting device is performed in synchronism with an ignition signal input.

* * * * *